United States Patent
Gebert (10) Patent No.: US 7,180,016 B2
(45) Date of Patent: Feb. 20, 2007

(54) WEIGHT SENSOR ACCESSORY (75) Inventor: Rudiger Heinz Gebert, Centurion (ZA)

(73) Assignee: Hi-Scan Technology (Pty) Ltd, Centurion (ZA)

(*) Notice: Subject to any disclaimer, the term of this patent is extended or adjusted under 35 U.S.C. 154(b) by 0 days.

(21) Appl. No.: 10/505,373

(22) PCT Filed: Feb. 12, 2003

(86) PCT No.: PCT/ZA03/00022

§ 371 (c)(1),
(2), (4) Date: Aug. 20, 2004

(87) PCT Pub. No.: WO03/071242

PCT Pub. Date: Aug. 28, 2003

(65) Prior Publication Data
US 2005/0082094 A1    Apr. 21, 2005

(30) Foreign Application Priority Data
Feb. 22, 2002  (ZA) .................... 02-1492

(51) Int. Cl.
*G01G 21/28* (2006.01)

(52) U.S. Cl. .............. 177/132; 177/134; 177/238; 177/244; 238/14

(58) Field of Classification Search .......... 238/14; 177/238–244, 132–134
See application file for complete search history.

(56) References Cited

U.S. PATENT DOCUMENTS

| | | | | |
|---|---|---|---|---|
| 2,477,960 A | * | 8/1949 | Caldwell | 15/215 |
| 2,512,310 A | * | 6/1950 | Corson | 15/215 |
| 3,191,701 A | | 6/1965 | Gray | 177/209 |
| 3,640,459 A | * | 2/1972 | Preisler | 238/14 |
| 3,861,592 A | * | 1/1975 | Fisher | 238/14 |
| 3,961,675 A | * | 6/1976 | Siegel | 177/126 |
| 4,281,738 A | * | 8/1981 | Jackson | 181/151 |
| 4,333,543 A | * | 6/1982 | Pietzsch et al. | 177/134 |
| 4,537,266 A | * | 8/1985 | Greenberg | 177/208 |
| 4,560,016 A | * | 12/1985 | Ibanez et al. | 177/210 R |
| 4,714,121 A | * | 12/1987 | Kroll et al. | 177/134 |
| 4,800,973 A | * | 1/1989 | Angel | 177/211 |
| 4,804,570 A | * | 2/1989 | Bedics | 428/53 |
| 4,884,645 A | * | 12/1989 | Knothe et al. | 177/180 |
| 4,934,469 A | * | 6/1990 | Jackson | 177/244 |
| 5,234,065 A | * | 8/1993 | Schmidt | 177/209 |
| 5,601,900 A | * | 2/1997 | Doscher | 428/149 |
| 5,894,112 A | | 4/1999 | Kroll | 177/134 |

FOREIGN PATENT DOCUMENTS

DE    42 20 810 A1    1/1994
JP    11 172207 A1    6/1999

\* cited by examiner

*Primary Examiner*—Randy W. Gibson
(74) *Attorney, Agent, or Firm*—Hahn and Moodley LLP; Vani Moodley (57) ABSTRACT

This invention provides a housing (60) for a weight sensor (10). The housing (60) is made from fluid-impervious material and is shaped and configured to completely enclose the weight sensor (10) in a fluid tight manner. The housing (60) includes a bottom portion in the form of a weight sensor accessory pad (62). The pad (62) includes a grooved lower surface (64), the grooves (66) being configured to enhance dispersion, in use, of fluids trapped between the pad (62) and a surface on which the pad (62) rests when a downward force is applied to the part (62).

5 Claims, 8 Drawing Sheets

WEIGHT SENSOR ACCESSORY

FIELD OF THE INVENTION

The present invention lies in the field of weighing in motion, that is, weighing vehicles when they pass over a weight sensor. A vehicle's speed may be calculated using the apparatus in conjunction with additional vehicle detection means. In particular, the invention relates to a weight sensor and to a method of manufacturing a weight sensor.

BACKGROUND TO THE INVENTION

The dynamic effects of a vehicle passing over a weight sensor at speed are minimised by the weight sensor protruding as little above the road surface as possible. With weight sensors being placed on top of the road surface this requires the weight sensors to be as thin as possible.

The Inventor is aware of weight sensors of this kind which comprise a sandwich construction of three electrically conductive sheets, such as aluminium sheets, separated from each other by elastic strips, such as polyurethane (PU) or silicon strips, bonded between the inner sheet and the two outer sheets. A signal from a stable oscillator is applied between the inner sheet on the one hand and the two outer sheets on the other and a circuit measures the change of capacitance which results when a vehicle passes over the weight sensor. The change in capacitance results from the sheets being compressed together by the weight of a vehicle wheel or wheels on a single axle or axis which may generically be termed an axle set. The change in capacitance is then converted electronically to produce a number related to the weight of the axle.

Such weight sensors have stringent environmental conditions to meet. Temperatures on road surfaces range between sub-zero to over 50 degrees centigrade, the oscillator and other circuit components must remain reasonably stable, the PU elasticity must remain reasonably stable and the bond of the PU to the sheets must remain intact. The sandwich must be impervious to entry of water between the sheets as this immediately causes leakage currents and adversely affects the security of the bond and the stability of the oscillator. Because it is necessary to measure weight of all axle sets of a vehicle which pass over a weight sensor within milliseconds of each other when a vehicle is at speed the PU strips must elastically recover from compression very quickly.

The Inventor is aware that these requirements have been substantially met by a product of this type which is moreover not unduly expensive compared, for example, to load cell technology. However, this type of product is manufactured by a laborious method requiring of the order of one man-week per weight sensor. The aluminium sheets are surface treated or primed for bonding and metal strips, which serve as moulding cores, are prepared with a release agent. A module containing the oscillator and circuitry and the metal strips are assembled between the sheets in a jig. PU is injected into the gaps between the metal strips and allowed to cure over 24 to 48 hours. The metal strips are then pulled out and the edges of the sheets are sealed by PU, applied around the edges, and allowed to cure.

Apart from the laborious nature of this method, quality control in the manufacture of such weight sensors is difficult and tends to be inconsistent. The weather at the time of the work causing greater or lesser humidity, impurities in the air of dust, oils or other workshop pollutants even only in parts per million which are normally not noticed affect the quality of the bonds, as well as errors by the artisans placing the release treated strips, etc. Bond quality is important because the compression of the PU strips causes shear forces at the bond so that any weakness in the bond results in partial or complete failure of the bond in service. Once failed the response characteristics are distorted and the weight sensor becomes unserviceable.

These problems inhibit the development of this industry from being able to supply substantial orders of reliable consistent quality weight sensors to the market place.

Examination of the role played by the air gaps created between the outer sheets and the inner sheet and between each pair of PU strips reveals that despite air being conventionally accepted as providing a good dielectric for the capacitive effect which is used in the product, the primary functional importance of the air gaps is mechanical. They allow the PU strips space in which to expand laterally when compressed between the sheets and so provide the order of elastic constant appropriate in this application. Volumetrically restricted PU is too rigid. Its elastic response to compression between the sheets, which the air gaps allow, is in fact a shear response or Poisson effect.

Furthermore, the Inventor has noted that the top sheet of such weight sensor tends to suffer damage after prolonged use. This is due to border regions of the top sheet resting on border parts of the weight sensor. Accordingly, when a vehicle passes over the weight sensor, the comparative rigidity of the border parts, and the compression of parts of the sheets proximate the PU strips, results in bending of the top sheet at the border region of the top sheet. Repeated bending results in stress fatigue and eventual permanent damage to the weight sensor. This problem inhibits the development of this industry from being able to supply a more durable weight sensor to the market place.

SUMMARY OF THE INVENTION

According to a first aspect of the invention there is provided a method of manufacturing a weight sensor which includes the following steps:
  electrically isolating a first electrically conductive sheet from a second electrically conductive sheet by inserting inserts of a foamed polymeric dielectric between the sheets;
  placing an elastic dielectric into spaces formed between the inserts of the foamed polymeric dielectric to bond with the sheets; and
  leaving the inserts of the foamed polymeric dielectric to remain between the sheets.

The method may include repeating the prior steps of the method for sandwiching of inserts of a foamed polymeric dielectric and an elastic dielectric between the second sheet and a third electrically conductive sheet such that the second sheet is electrically isolated from the first and third sheets.

The elastic dielectric may be chosen from those which elastically recover from compression very quickly, typically in the order of milliseconds, and are capacitively insensitive to temperature changes in a range encountered on road surfaces. The range is typically between −20° C. and 85° C. Preferably, the elastic dielectric is also chosen from those which are water resistant and form a strong bond with the sheets. The elastic dielectric may be polyurethane (PU).

Placing of the elastic dielectric into spaces formed between the inserts may include injecting the elastic dielectric into the spaces.

The foamed polymeric dielectric may be a closed cell foamed polymeric dielectric. The closed cell foamed polymeric dielectric may be selected for good dielectric properties, for example, Neoprene (trademark) i.e. chloroprene rubber may be used. The closed cells or pores in the inserts contain air or another gas which provides a sufficient elasticity for the elastic dielectric to expand laterally displacing the inserts without significantly adversely affecting the favorable elasticity properties of the elastic dielectric for this application. The air or another gas in the closed cells or pores may even be removed to form a vacuum.

The inserts may be linear strips analogous to the air gaps in the existing product. However, the application of such inserts in the method according to this invention allows the inserts to be of any shape, not necessarily only linear, because they do not have to be pulled out as the metal strips of the existing product must be.

According to a preferred embodiment of the invention the inserts are of shapes that leave discrete areas, e.g. circular or rounded squares or other shapes to be occupied by the elastic dielectric. Sprues or passages may be left for the elastic dielectric to be injected into after the inserts are sandwiched between the sheets since as mentioned the inserts remain between the sheets.

The electrically conductive sheets may be metallic sheets of good conductivity and sufficient strength to ensure a long operational life of the product of the method. The sheets may be aluminium sheets. Each sheet may include an electrically conductive film covering a plate made from a material which ensures a long operational life of the weight sensor.

The surfaces of the sheets in the spaces between the inserts may be primed for good bonding with the elastic dielectric. This may be done after the inserts are placed on the sheets prior to or after sandwiching them together.

The method may include electrically connecting capacitive measuring means between the first sheet and the second sheet so as to measure a change of capacitance between the sheets when a vehicle passes over the sheets. The method may include electrically connecting the capacitive measuring means between the second sheet and the third sheet. The method may further include converting the change of capacitance to a number related to a weight of the vehicle.

The method may include sealing the borders of the product of the method produced thus far to make it impervious of entry of water.

The use of inserts according to the invention allows an approach which may ameliorate the problem of the sensitivity of the bond of the elastic dielectric to the sheets to pollution of the primed surface.

According to a second aspect of the invention there is provided a method of manufacturing a weight sensor which includes the following steps:

pre-cutting a first full layer of a foamed polymeric dielectric to a desired pattern to define inserts and removable spacers;

priming a first surface of a first electrically conductive sheet for bonding;

placing the first full layer over the first sheet immediately after the first sheet has been primed thereby protecting the first primed surface of the first sheet;

removing the spacers;

leaving the inserts of the first full layer in place;

priming a second electrically conductive sheet for bonding;

immediately sandwiching the inserts of the first full layer between the first and second sheets; and adding an elastic dielectric into the spaces formed by the removal of the spacers so as to bond to the sheets.

The method may include repeating the prior steps of the method for sandwiching of inserts of a foamed polymeric dielectric and an elastic dielectric between the second sheet and a third electrically conductive sheet such that the second sheet is electrically isolated from the first and third sheets.

The foamed polymeric dielectric may be a closed cell foamed polymeric dielectric.

According to a third aspect of the invention there is provided a method of manufacturing a weight sensor which includes the following steps:

coating a first and a second side of a first full layer of a foamed polymeric dielectric with a contact adhesive or the like;

placing a first and a second protective non-stick foil against the contact adhesive coating the first and the second side respectively;

pre-cutting the first full layer and the foils to a desired pattern to define inserts and removable spacers;

removing the foil from the first side of the first full layer, only in the zones which cover the inserts;

priming a first surface of a first electrically conductive sheet and a first surface of a second electrically conductive sheet for bonding;

immediately placing the first full layer having foils attached thereto onto the first surface of the first sheet such that the first side of the first full layer is in contact with the first surface of the first sheet and such that the inserts stick to the first surface, but the spacers do not stick due to the presence there of the foil;

immediately removing the foil from a second side of the first full layer;

immediately removing the spacers, which include foil adhered to the first side thereof, from the first full layer;

immediately sandwiching the inserts between the sheets; and adding an elastic dielectric into spaces formed by the removal of the spacers so as to bond to the sheets.

The method may include repeating the prior steps of the method for sandwiching of inserts of a second full layer of a closed cell foamed polymeric dielectric and an elastic dielectric between the second sheet and a third electrically conductive sheet such that the second sheet is electrically isolated from the first and third sheets.

The foamed polymeric dielectric may be a closed cell foamed polymeric dielectric.

The invention includes in its scope the products produced by the methods described.

According to a fourth aspect of the invention there is provided a weight sensor which includes a first electrically conductive sheet electrically isolated from a second electrically conductive sheet by inserts of a foamed polymeric dielectric and an elastic dielectric in spaces formed between the inserts located between the sheets.

The sensor may include a third electrically conductive sheet electrically isolated from the second sheet by inserts of a closed cell foamed polymeric dielectric and an elastic dielectric in spaces formed between the inserts located between the second and third sheets.

The elastic dielectric may be chosen from those which elastically recover from compression very quickly, typically in the order of milliseconds, and are capacitively insensitive to temperature changes in a range encountered on road surfaces. The range is typically between −20° C. and 85° C. Preferably, the elastic dielectric is also chosen from those which are water resistant and form a strong bond with the sheets. The elastic dielectric may be polyurethane (PU).

The foamed polymeric dielectric may be a closed cell foamed polymeric dielectric. The closed cell foamed polymeric dielectric may be selected for good dielectric properties, for example, Neoprene (trademark) i.e. chloroprene rubber may be used. The closed cells or pores in the inserts may contain air or another gas which provides a sufficient elasticity for the elastic dielectric to expand laterally displacing the inserts without significantly adversely affecting the favorable elasticity properties of the elastic dielectric for this application. The air or another gas in the closed cells or pores may even be removed to form a vacuum.

The inserts may be linear strips analogous to the air gaps in the existing product. However, the application of such inserts in the method according to this invention allows the advantage that inserts may be of any shape, not necessarily only linear, because they do not have to be pulled out as the metal strips of the existing product must be.

According to a preferred embodiment of the invention the inserts are of shapes that leave discrete areas, e.g. circular or rounded squares or other shapes to be occupied by the elastic dielectric. Sprues or passages may be left for the elastic dielectric to be injected into after the inserts are sandwiched between the sheets since as mentioned the inserts remain between the sheets.

The electrically conductive sheets may be metallic sheets of good conductivity and sufficient strength to ensure a long operational life of the weight sensor. The sheets may be aluminium sheets. Each sheet may include an electrically conductive film covering a plate made from a material which ensures a long operational life of the weight sensor.

The inserts between each sheet may be integrally connected to each other to form a full layer of the foamed polymeric dielectric between each sheet.

The sensor may include capacitive measuring means, electrically connected between the first sheet and the second sheet, which measures a change of capacitance between the sheets when a vehicle passes over the sheets. The capacitive measuring means may be electrically connected between the second sheet and the third sheet. The sensor may further include converting means for converting the change of capacitance to a number related to a weight of the vehicle.

Borders of the sensor may be sealed to make it impervious of entry of water.

According to a fifth aspect of the invention, there is provided a weight sensor which includes
- a top electrically conductive sheet electrically isolated from a lower electrically conductive sheet by an elastic dielectric, the elastic dielectric being configured between the sheets to allow lateral expansion of the elastic dielectric when a downward force is applied to the weight sensor causing the sheets to compress; and
- a border part of the sensor, which border part extends from a border region of a part of the sensor located on the ground, in use, to a border region of the top sheet, wherein the border part is connected to an upper surface of the top sheet so that the top sheet does not rest on the border part.

The border part may be shaped and dimensioned to form a ramp for vehicles to drive on and off the sensor, in use.

The part of the sensor located on the ground, in use, may be the lower sheet.

The sensor may include a still lower electrically conductive sheet electrically isolated from the lower sheet by an elastic dielectric, the elastic dielectric being configured between the sheets to allow lateral expansion of the elastic dielectric when a downward force is applied to the weight sensor causing the sheets to compress, wherein the part of the sensor located on the ground, in use, is a border region of the still lower sheet. It is to be appreciated that this includes an embodiment of this aspect of the invention where the border part and the still lower sheet comprise an integral unit.

The elastic dielectric may be configured between the sheets to allow lateral expansion of the elastic dielectric by way of the elastic dielectric being in the form of a plurality of linear strips separated by air gaps. The elastic dielectric may be configured between the sheets to allow lateral expansion of the elastic dielectric by way of the elastic dielectric being placed in spaces formed between inserts of a foamed polymeric dielectric located between the sheets.

The sensor typically includes two like border parts connected to apposing border regions of the top sheet.

BRIEF DESCRIPTION OF THE DRAWINGS

The invention will now be described, by way of a non-limiting example, with reference to the following diagrammatic drawings, in which.

DETAILED DESCRIPTION OF THE DRAWINGS

Figure 1:
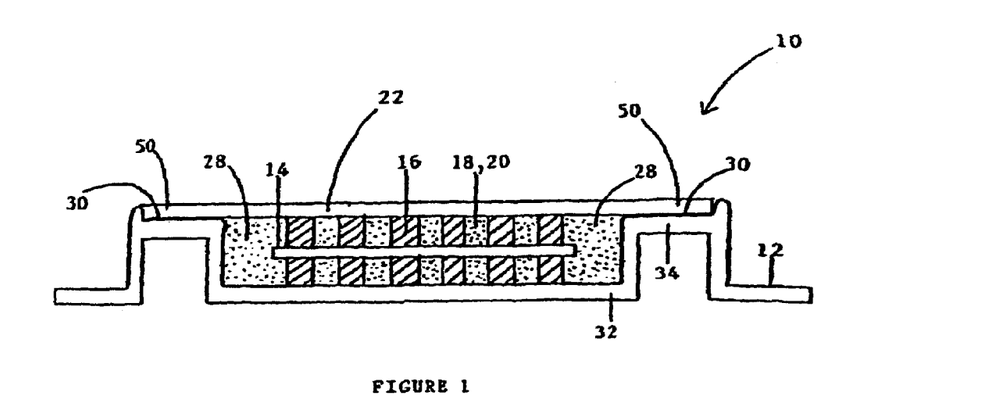
FIGS. 1 and 2 show in side and plan views respectively, a weight sensor in accordance with one aspect of the invention.
Figure 2:
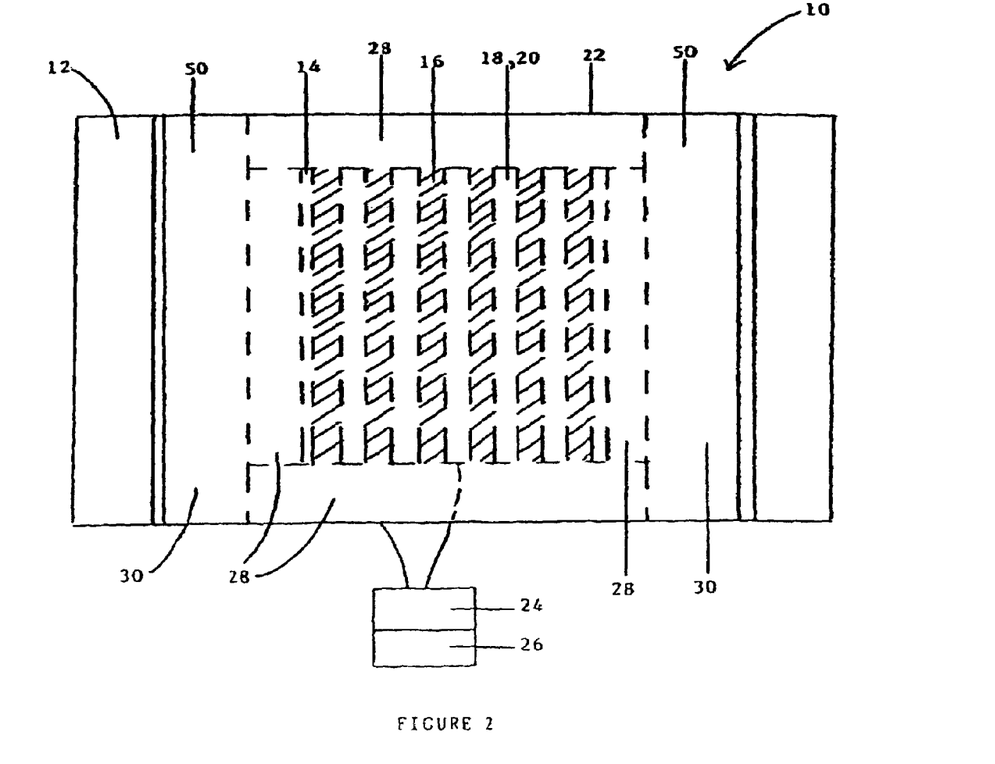

With reference to FIGS. 1 and 2, reference numeral 10 shows a weight sensor according to the invention. The weight sensor 10 includes a first electrically conductive sheet 12 electrically isolated from a second electrically conductive sheet 14 by inserts of a closed cell foamed polymeric dielectric 16 and an elastic dielectric 18 in spaces 20 formed between the inserts 16 located between the sheets 12, 14.

The sensor 10 includes a third electrically conductive sheet 22 electrically isolated from the second sheet 14 by inserts of a closed cell foamed polymeric dielectric 16 (shown as shaded areas in the figures) and an elastic dielectric 18 in spaces 20 formed between the inserts 16 located between the second and third sheets 14, 22.

The first sheet 12 has a flat rectangular base 32 and raised border parts 34 proximate a pair of apposing borders of the first sheet 12. The border parts 34 are shaped and dimensioned to receive on top thereof a pair of apposing border regions 50 of the third flat rectangular sheet 22. The second sheet 14 is a flat rectangular sheet which is sandwiched between the first and third sheets 12, 22. The sheets 12, 14, 22 are aluminium sheets of good conductivity and sufficient strength to ensure a long operational life of the weight sensor.

The inserts 16 are in the form of linear strips analogous to the air gaps in the existing product. The inserts 16 are made from Neoprene (trademark). The closed cells or pores in the inserts 16 contain air which provides a sufficient elasticity for the elastic dielectric 18 to expand laterally displacing the inserts 16 without significantly adversely affecting the favorable elasticity properties of the elastic dielectric 18 for this application.

The elastic dielectric 18 is made from polyurethane (PU).

The sensor 10 includes capacitive measuring means 24, electrically connected between the first sheet 12 and the second sheet 14, which measures a change of capacitance between the sheets 12, 14 when a vehicle passes over the sheets 12, 14. The sensor 10 further includes converting means 26 for converting the change of capacitance to a number related to a weight of the vehicle. It is to be appreciated that, in an alternative embodiment of the invention (not shown), the capacitive measuring means 24 is electrically connected between the second sheet 14 and the third sheet 22.

Inner borders 28 and outer borders 30 of the sensor 10 are sealed to make it impervious of entry of water. The outer borders 30 are defined by the zones of contact between the first and third sheets 12, 22 and are sealed with an adhesive resin. As the inner borders 28 are sealed proximate the borders of the second sheet 14 this seal must also be a dielectric so as to electrically isolate the second sheet 14 from the first and third sheets 12, 22. PU is used to facilitate the sealing of the inner borders 28.

Figure 3:
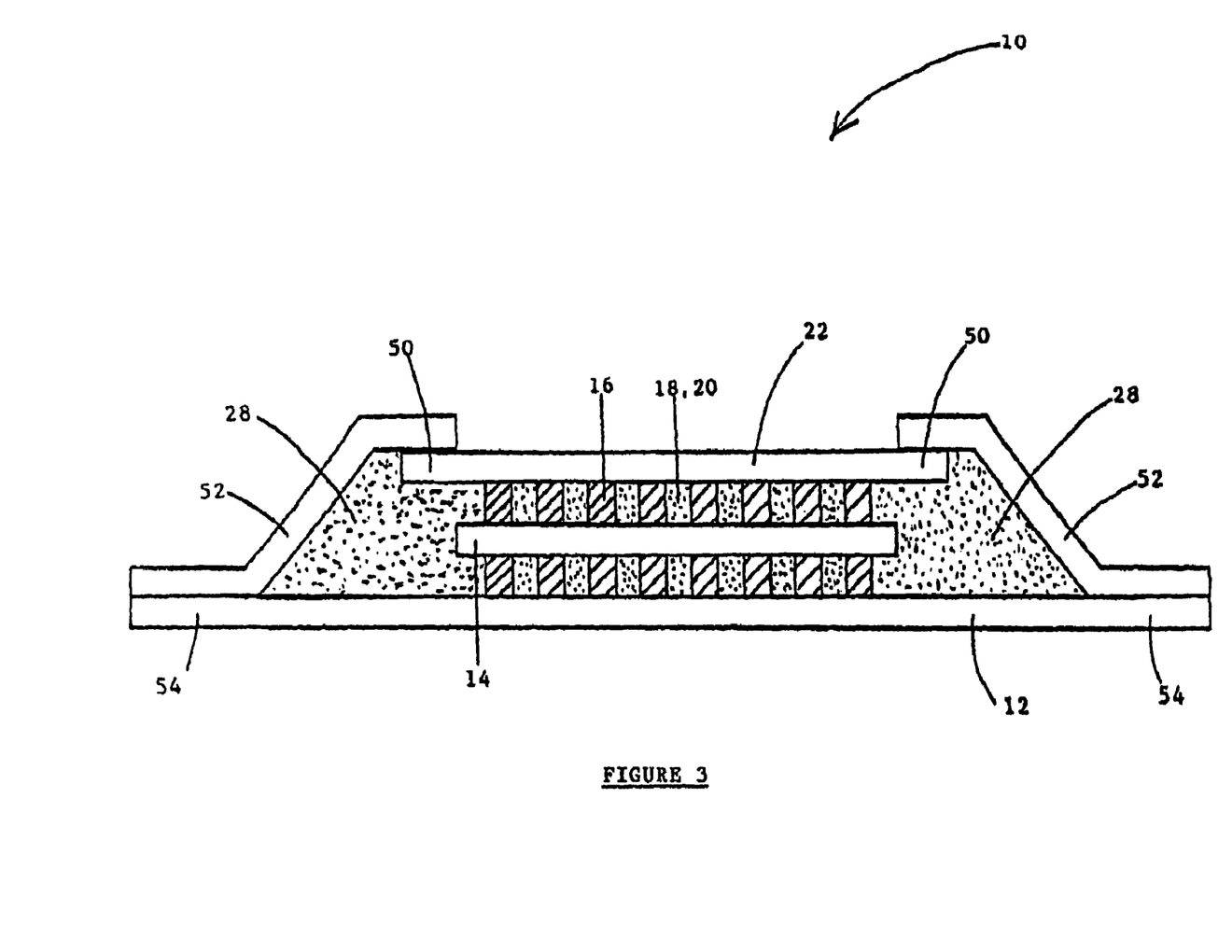
FIG. 3 shows in plan view, an alternate embodiment of a closed cell foamed polymeric dielectric in the form of a full layer for use in a weight sensor.

FIG. 3 shows an alternate embodiment of the closed cell foamed polymeric dielectric in the form of a full layer 36 which is used to electrically isolate the second sheet 14 from the first and third sheets 12, 22. The full layer 36 is coated with a contact adhesive which is covered by a protective non-stick foil on both sides of the full layer 36. The full layer 36 and the foils are pre-cut to define inserts 16 and removable spacers 38. The spacers 38 consist of a plurality of disc-shaped segments 40 linked by sprues 42.

During the method of manufacturing the weight sensor 10 the foil is removed from a first side of the first full layer 36, only in the zones which cover the inserts 16. A first surface of the first sheet 12 and a first surface of the second sheet 14 are then primed for bonding. The first full layer 36 having foils attached thereto is immediately placed onto the first surface of the first sheet 12 such that the first side of the first full layer 36 is in contact with the first surface of the first sheet 12 and such that the inserts 16 stick to the first surface, but the spacers 38 do not stick due to the presence there of the foil. The foil is then immediately removed from a second side of the first full layer 36 whereafter the spacers 38, which include foil adhered to the first side thereof, are removed from the first full layer 36. The inserts 16 are then immediately sandwiched between the sheets 12, 14 and the elastic dielectric 18 is placed, by means of injection, into spaces 20 formed by the removal of the spacers 38.

The prior steps of the method is then repeated for sandwiching of inserts of a second full layer (not shown) of a closed cell foamed polymeric dielectric and an elastic dielectric 18 between the second sheet 14 and the third sheet 22 such that the second sheet 14 is electrically isolated from the first and third sheets 12, 22.

It is to be appreciated that in another embodiment of the invention, each insert may be an open pore insert, in a suitable configuration. Thus sufficiently small pores may allow this to be suitable, or a material which is resistant to ingress of the elastic dielectric into the pores sufficiently. Or an open pore material which has a skin or closed pore outer layer may be used.

Figure 4:
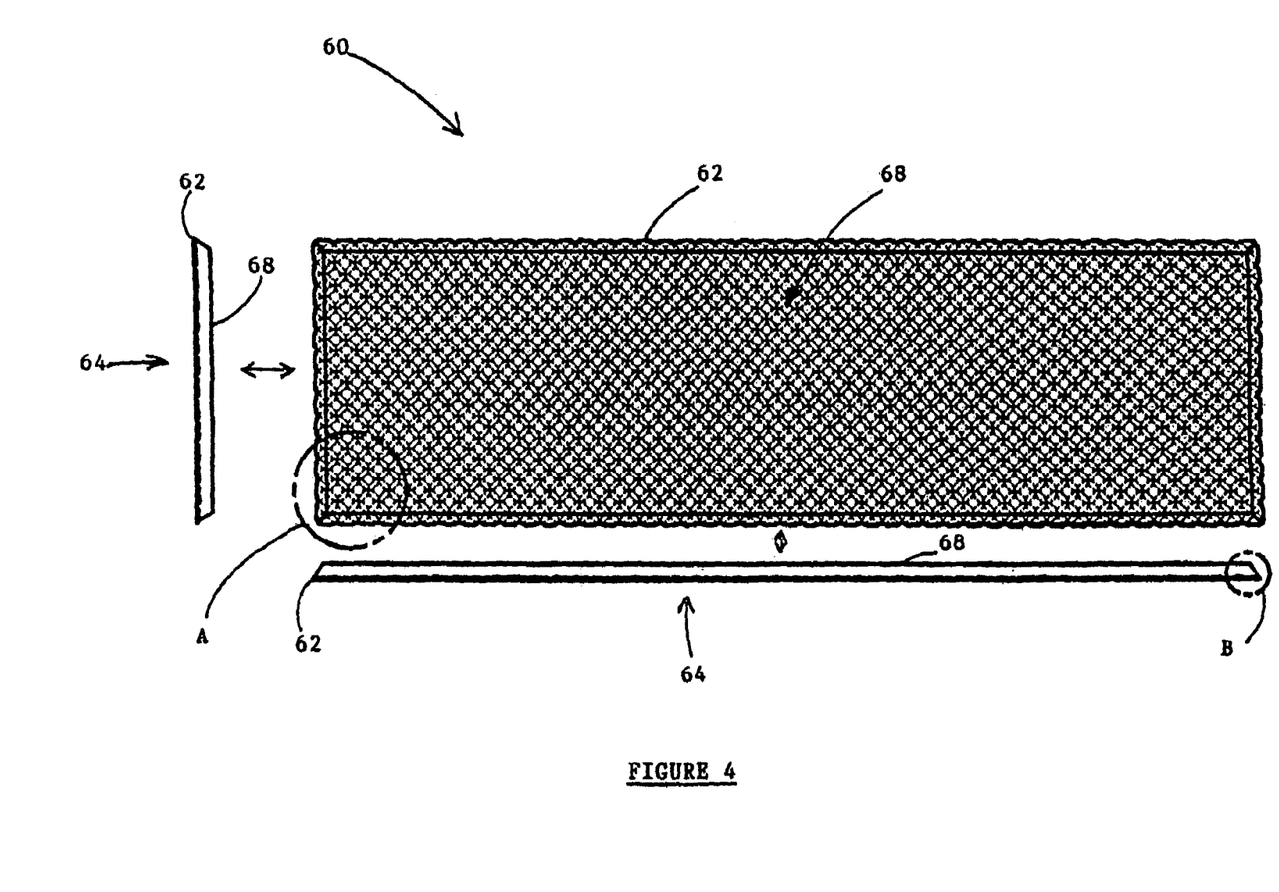
FIG. 4 shows, in side view, a weight sensor in accordance with another aspect of the invention aimed at reducing bending of the top sheet at a border region of the top sheet.
Figure 5:
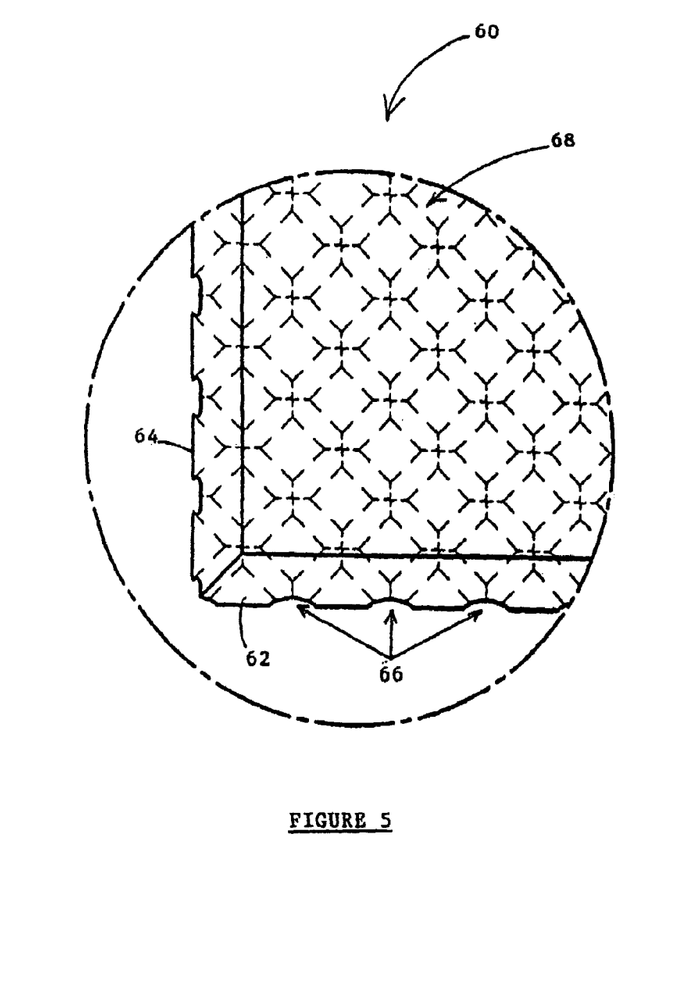
FIGS. 5 and 6 show exploded views fo features A and B, respectively, of FIG. 4.
Figure 6:
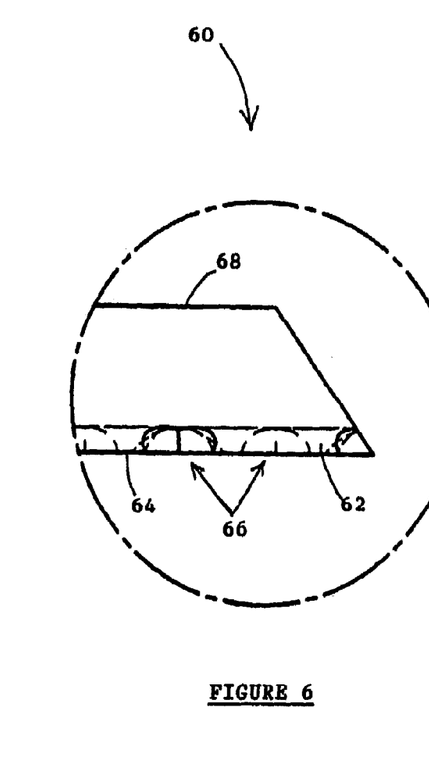
Figure 7:
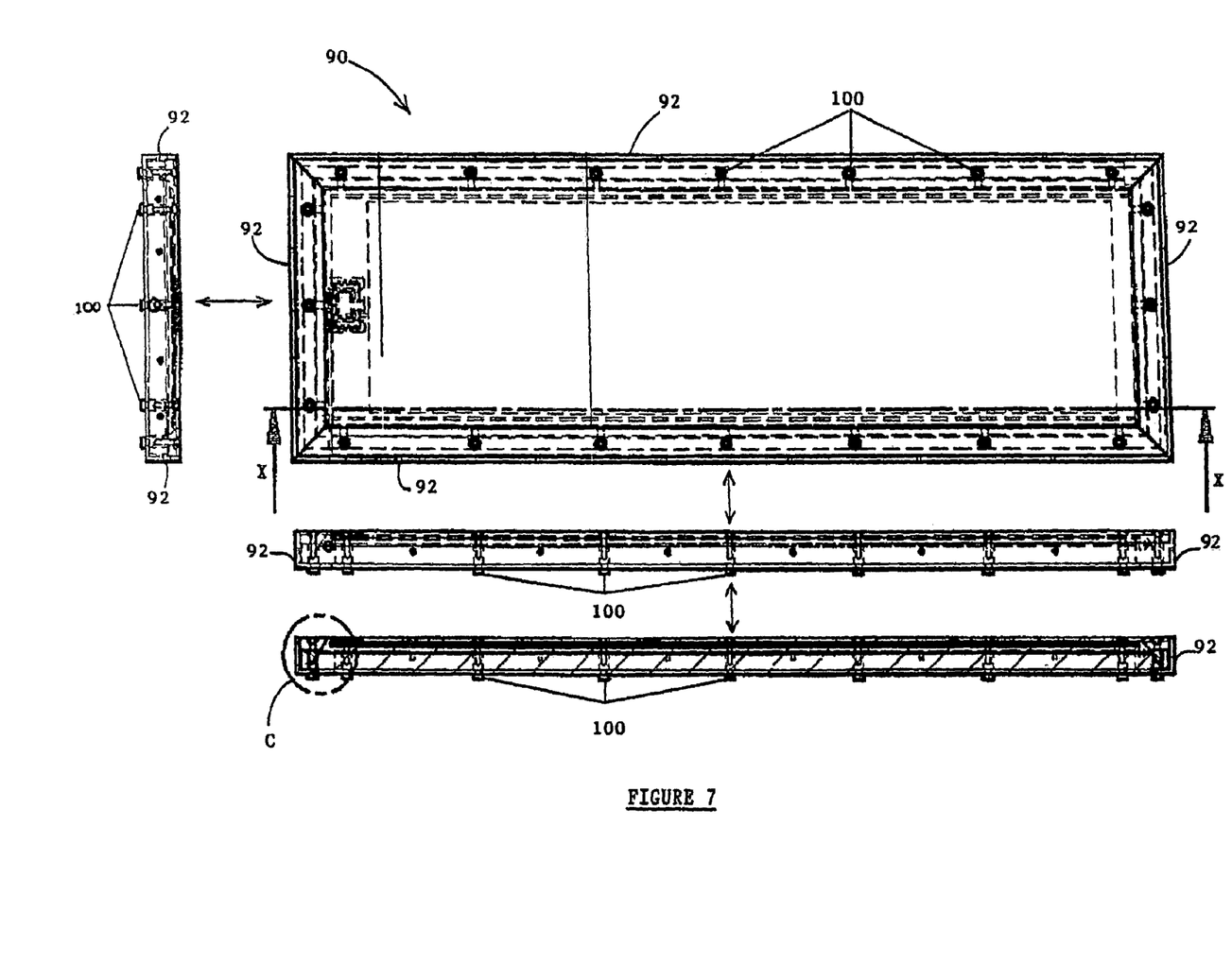
FIG. 7 shows, in plan, side, front and sectioned front views, a container for a weight sensor housed within the housing shown in FIG. 4, in accordance with the invention.
Figure 8:
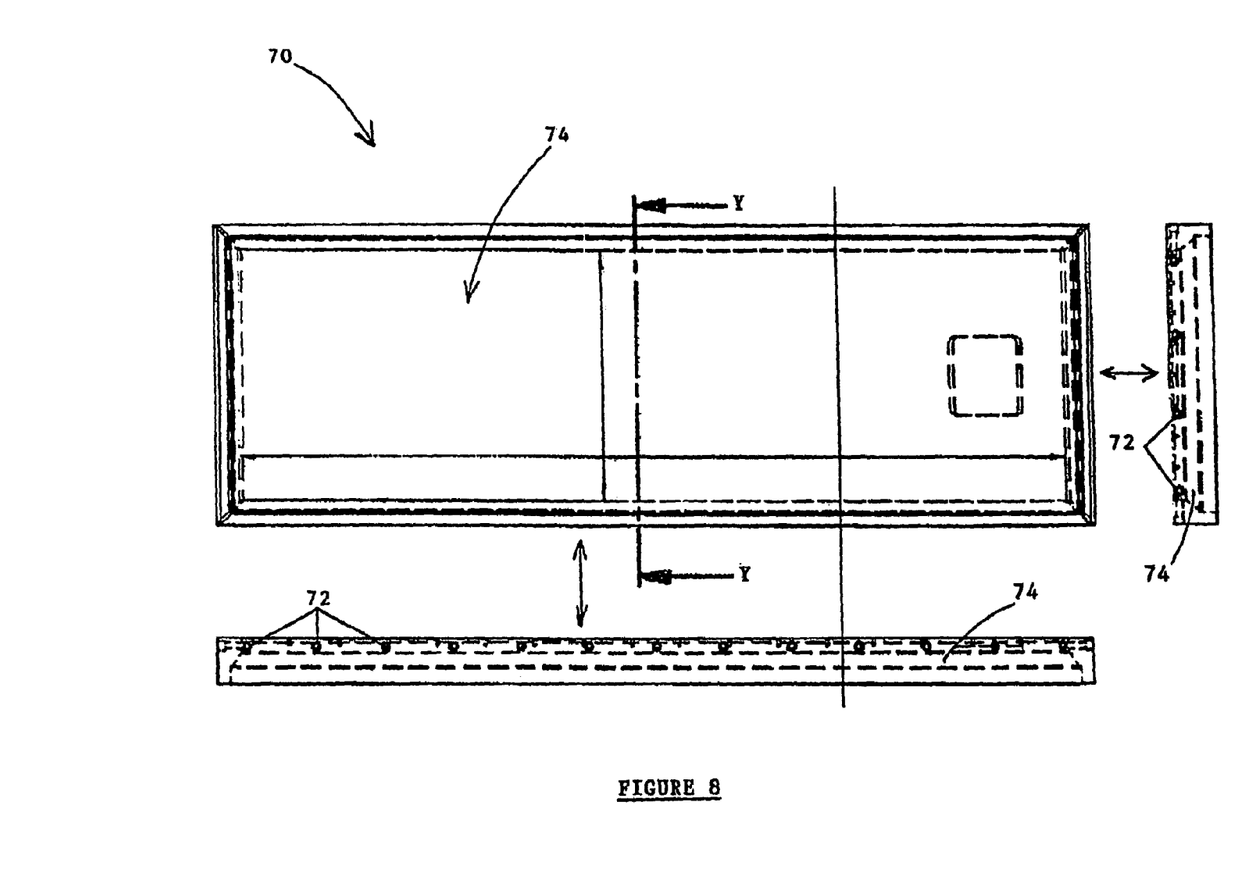
FIG. 8 shows, in plan, side, and front views, a mould for the housing shown in FIG. 4, in accordance with the invention.
Figure 9:
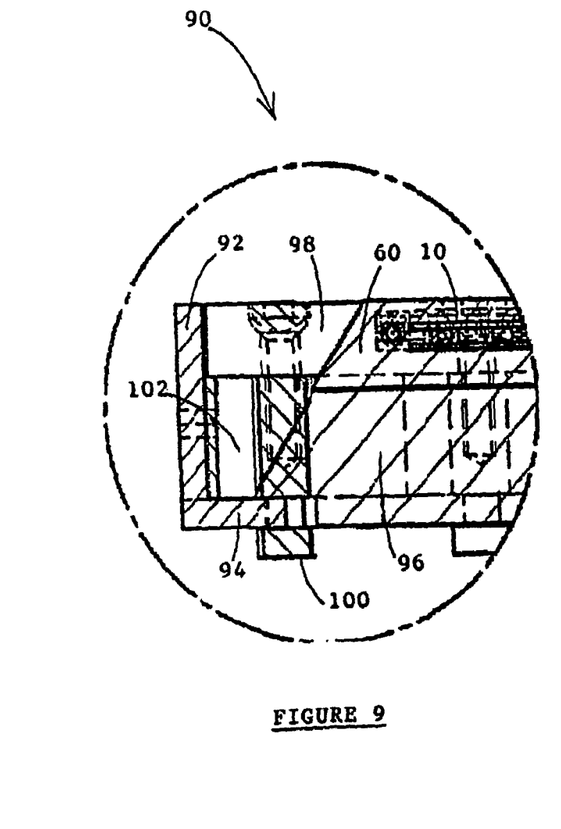
FIG. 9 shows an exploded view of feature C of the sectioned front view through line X–X shown in the plan view of FIG. 7.
Figure 10:
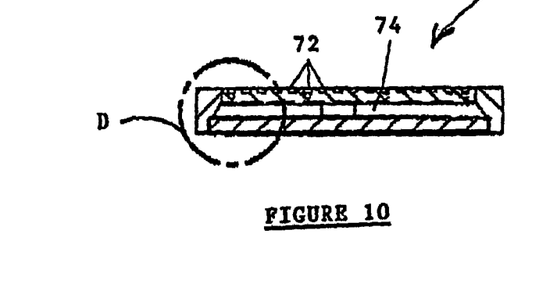
FIG. 10 shows a cross section through line Y–Y of FIG. 8.
Figure 11:
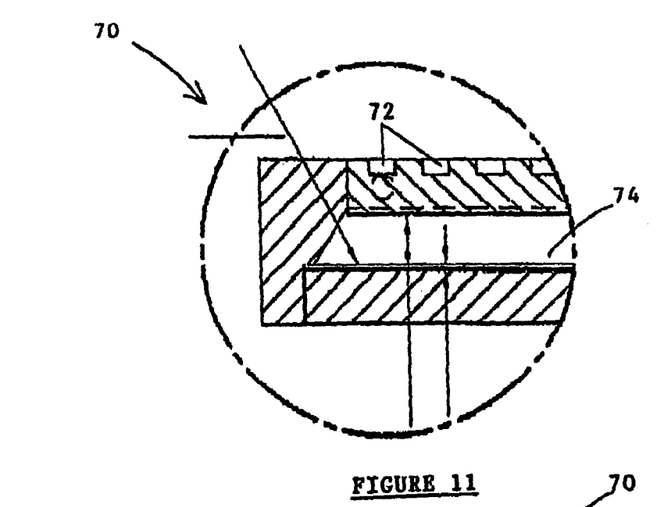
FIG. 11 shows an exploded view of feature D of FIG. 10.
Figure 12:
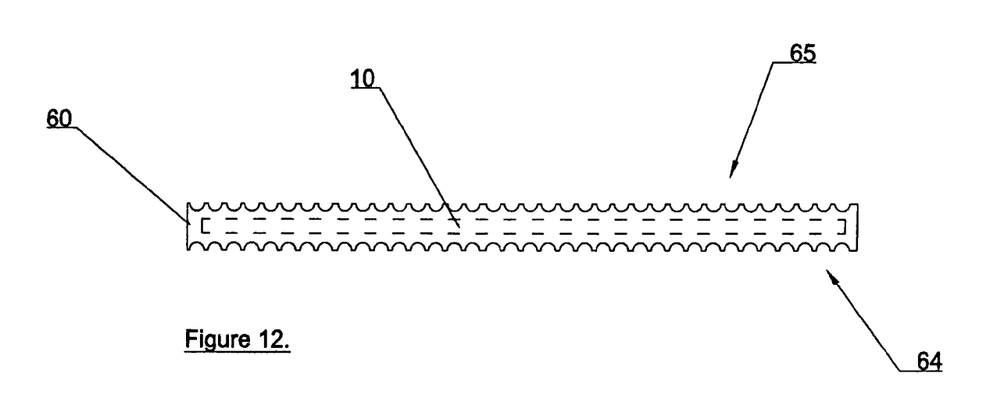
FIG. 12 shows, in side view, a housing for a weight sensor.
Figure 13:
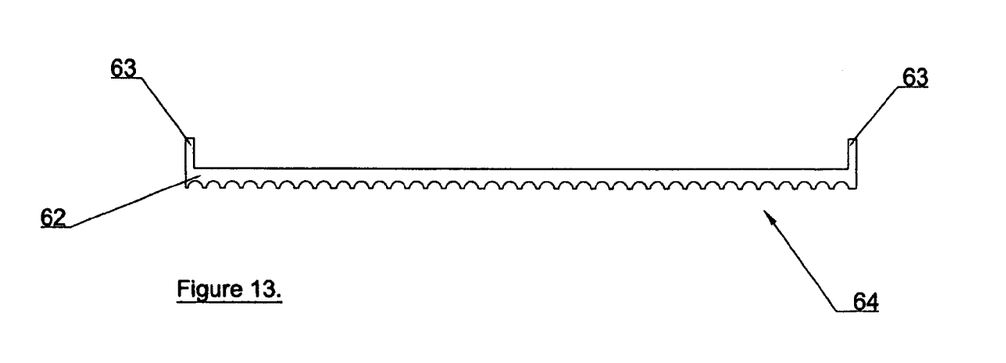
FIG. 13 shows, in side sectional view, a pad for fitment to a weight sensor.

FIG. 4 shows a weight sensor 10 in accordance with another aspect of the invention aimed at reducing bending of the top sheet 22 at border regions 50 of the top sheet 22. It is to be appreciated that, where appropriate in FIG. 4, like reference numerals have been used to indicate like or similar features to those shown in FIGS. 1 and 2.

The weight sensor 10 includes two border parts 52, each extending from a border region 54 of the still lower sheet 12 (which is the part of the sensor 10 located on the ground, in use, in this embodiment of the invention) to a border region 50 of the top sheet 22. Each border part 52 is connected to an upper surface of the top sheet 22 so that the top sheet 22 does not rest on the border parts 52. The border parts 52 are shaped and dimensioned to form a ramp for vehicles to drive on and off the sensor 10, in use.

It is to be appreciated that, as in FIGS. 1 and 2, the elastic dielectric 18 is configured between the sheets 12, 14, 22 to allow lateral expansion of the elastic dielectric 18 when a downward force is applied to the weight sensor 10 causing the sheets 12, 14, 22 to compress.

It is also to be appreciated that, in another embodiment of this aspect of the invention, the border parts 52 and the still lower sheet 12 may comprise an integral unit.

The Inventor regards it as an advantage that the inserts are not removed after the elastic dielectric is placed within the weight sensor as the removal may cause impurities associated with the inserts to remain within the sensor. The insertion of the full layer of inserts has the added advantage of reducing production time as it facilitates the proper alignment of the elastic dielectric between the plates. The Inventor also regards it as an advantage that the top sheet does not rest on the border parts of the weight sensor. This should reduce bending of border regions of the top sheet when a vehicle passes over the sensor thereby reducing stress fatigue in the sensor.

The invention claimed is:

1. A housing for a weight sensor, the housing including a lower surface which includes a repeating pattern of protrusions made from an elastic material which protrusions are spaced apart to define a plurality of spaces between them so as to enhance dispersion, in use, of fluids trapped between the housing and a surface on which the housing rests when a downward force is applied to the housing, the housing being made from fluid-impervious material and the housing being shaped and configured to completely enclose the weight sensor in a fluid tight manner.

2. A housing as claimed in claim 1, wherein the pattern of protrusions include a rectangular pattern.

3. A housing as claimed in claim 1, wherein the pattern of protrusions are orientated at between 35° to 55° in relation to the lower surface of the housing.

4. A housing as claimed in claim 1, wherein the spaces have a width of between 20 mm and 60 mm.

5. A housing as claimed in claim 1, wherein the spaces have a depth of between 1 mm and 10 mm.

* * * * *